(12) United States Patent
Bernadet et al.

(10) Patent No.: US 12,319,440 B2
(45) Date of Patent: Jun. 3, 2025

(54) CONNECTING DEVICE COMPRISING TWO OFF-CENTER RINGS WITH A FRUSTOCONICAL AND/OR SPHERICAL BEARING SURFACE, AIRCRAFT OR AIRCRAFT FLOOR COMPRISING AT LEAST TWO PORTIONS CONNECTED BY AT LEAST ONE SUCH CONNECTING DEVICE

(71) Applicant: Airbus Operations SAS, Toulouse (FR)

(72) Inventors: Philippe Bernadet, Toulouse (FR); Damien Aguera, Toulouse (FR); Yannick Marin, Toulouse (FR); Sylvain Peyraud, Toulouse (FR); Caroline Le, Toulouse (FR); Yannick Lampure, Toulouse (FR); Stéphane Bournazaud, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 18/160,606

(22) Filed: Jan. 27, 2023

(65) Prior Publication Data
US 2023/0242277 A1    Aug. 3, 2023

(30) Foreign Application Priority Data
Jan. 31, 2022   (FR) ...................................... 2200797

(51) Int. Cl.
*B64F 5/10* (2017.01)
(52) U.S. Cl.
CPC ..................... *B64F 5/10* (2017.01)

(58) Field of Classification Search
CPC . B64F 5/10; B25B 27/062; B64C 1/18; F16B 5/025; F16B 2/18; Y10T 29/49948
See application file for complete search history.

(56) References Cited

U.S. PATENT DOCUMENTS

| | | | | |
|---|---|---|---|---|
| 3,841,771 A | * | 10/1974 | Shankwitz | F16C 11/045 403/258 |
| 4,613,000 A | * | 9/1986 | Moore | F16B 5/025 173/217 |
| 5,141,357 A | * | 8/1992 | Sherman | F16B 5/025 403/4 |

(Continued)

OTHER PUBLICATIONS

French Search Report dated Sep. 8, 2022; priority document.

*Primary Examiner* — Lawrence Averick
(74) *Attorney, Agent, or Firm* — Greer, Burns & Crain, Ltd.

(57) ABSTRACT

A connecting device including first and second off-center rings, the second ring being positioned in the first ring. The peripheral outer surface of the first ring is frustoconical and has a smaller cross section oriented in a first direction, and the inner surface of the first ring and the outer surface of the second ring, which surfaces interact with one another, have cross sections which increase between a first cross section and a second cross section that is offset in relation to the first cross section in an opposite direction to the first direction. This arrangement makes it possible to be able to prevent the rotation of the first and second rings once their angular positioning has been adjusted.

11 Claims, 14 Drawing Sheets

(56) References Cited

U.S. PATENT DOCUMENTS

| | | | | |
|---|---|---|---|---|
| 5,320,443 | A * | 6/1994 | Lien | E02F 9/006 |
| | | | | 403/334 |
| 7,455,471 | B2 * | 11/2008 | Gawehn | F16B 5/025 |
| | | | | 411/398 |
| 10,914,556 | B2 * | 2/2021 | Stewart | F41H 5/013 |
| 11,466,495 | B2 * | 10/2022 | Veilleux | E05D 15/063 |
| 2006/0039749 | A1 * | 2/2006 | Gawehn | F16B 5/025 |
| | | | | 403/367 |
| 2020/0023936 | A1 | 1/2020 | Gardner | |
| 2022/0381273 | A1 * | 12/2022 | Goupil | F16B 37/122 |
| 2023/0242277 | A1 * | 8/2023 | Bernadet | B64C 1/18 |
| | | | | 29/525.02 |

* cited by examiner

CONNECTING DEVICE COMPRISING TWO OFF-CENTER RINGS WITH A FRUSTOCONICAL AND/OR SPHERICAL BEARING SURFACE, AIRCRAFT OR AIRCRAFT FLOOR COMPRISING AT LEAST TWO PORTIONS CONNECTED BY AT LEAST ONE SUCH CONNECTING DEVICE

CROSS-REFERENCES TO RELATED APPLICATIONS

This application claims the benefit of the French patent application No. 2200797 filed on Jan. 31, 2022, the entire disclosures of which are incorporated herein by way of reference.

FIELD OF THE INVENTION

The present application relates to a connecting device comprising two off-center rings with a frustoconical and/or spherical bearing surface and to an aircraft or aircraft floor comprising at least two portions connected by at least one such connecting device.

BACKGROUND OF THE INVENTION

In an assembly mode, some equipment of an aircraft is assembled in the structure of the aircraft. When such equipment is positioned in a cramped location, a reduced number of operators can perform work on them at the same time, and so this assembly mode results in prolonging the time needed to assemble an aircraft.

To reduce this assembly time, some equipment is assembled outside of the structure of the aircraft and then incorporated inside of the structure once they have been assembled. This assembly technique can be implemented with difficulty for bulky equipment positioned notably in the nose of the aircraft, below the floor, since the openings providing access thereto have limited dimensions.

The present invention aims to overcome all or some of the drawbacks of the prior art.

SUMMARY OF THE INVENTION

To that end, a subject of the invention is a connecting device comprising first and second rings and a connecting element which has a shaft, the first ring having a first peripheral outer surface configured to interact with a peripheral inner wall of a first through-hole of a first part of an assembly, a first passage orifice delimited by a first peripheral inner surface configured to interact with the second ring, and first and second transverse faces; the first peripheral inner and outer surfaces being off-center, the second ring having a second peripheral outer surface interacting with the first peripheral inner surface of the first ring, a second passage orifice delimited by a second peripheral inner surface and configured to receive a portion of the shaft of the connecting element during operation, and first and second transverse faces; the second peripheral inner and outer walls being off-center, the first and second rings having shapes exhibiting symmetry of revolution about an axis of revolution parallel to a longitudinal direction.

According to the invention, the first peripheral outer surface of the first ring is frustoconical and has cross sections that have a smaller cross section located at the second transverse face of the first ring. In addition, the first peripheral inner surface of the first ring and the second peripheral outer surface of the second ring have cross sections which increase between a first cross section and a second cross section that is offset towards the first transverse faces in relation to the first cross section.

Providing two off-center rings makes it possible to compensate a possible misalignment between two pre-drilled holes provided in the parts of an assembly that are connected by the connecting element. The geometry of the first and second rings makes it possible to be able to prevent them from rotating when their angular position is adjusted, thus simplifying the installation of the connecting element. This connecting device may be used to connect two portions of an aircraft floor, thus making it possible to create a wide opening in the floor for the passage of bulky equipment assembled outside the aircraft.

According to a first variant, the first peripheral inner surface of the first ring and the second peripheral outer surface of the second ring have identical spherical bearing surfaces.

According to a second variant, the first peripheral inner surface of the first ring and the second peripheral outer surface of the second ring are frustoconical and have substantially the same solid angle.

According to another feature, the first and second rings have substantially the same thickness, the first transverse faces of the first and second rings being substantially coplanar.

Another subject of the invention is an assembly comprising at least first and second parts and at least one connecting device according to one of the above features.

According to another feature, the first and second rings are positioned in a first frustoconical through-hole of the first part, which through-hole is delimited by a peripheral inner wall, the first peripheral outer surface of the first ring forming a solid angle substantially equal to that of the peripheral inner wall of the first through-hole, the second transverse faces of the first and second rings being oriented towards the second part.

Another subject of the invention is an aircraft comprising at least one connecting device according to one of the above features.

Another subject of the invention is a tool for mounting a connecting device according to one of the above features. This mounting tool comprises an axial tension system configured to apply a tensile force to at least the second ring in a direction parallel to the longitudinal direction, going from the first transverse faces towards the second transverse faces.

According to another feature, the mounting tool comprises at least one system for adjusting the angular positioning of at least one of the first and second rings.

According to another feature, the angular positioning adjustment system comprises a first portion configured to pivot the first ring, a first coupling system for temporarily rotationally coupling the first portion and the first ring, a second portion configured to pivot the second ring, and a second coupling system for temporarily rotationally coupling the second portion and the second ring.

According to another feature, the mounting tool comprises a centering system having a centering shaft which extends between first and second ends and has a diameter substantially identical to that of the shaft of the connecting element, said centering shaft being configured to be received in the second passage orifice of the second ring during operation.

According to another feature, the centering system comprises a flange which is integral with the centering shaft, has a cross section greater than that of the centering shaft, is spaced apart from the first and second ends of the centering shaft and has a first transverse surface, which is oriented towards the first end of the centering shaft and is configured to be pressed against the first transverse face of the second ring during operation, and a second transverse surface, which is oriented towards the second end of the centering shaft.

According to another feature, the first portion is in the form of a first pivoting ring which comprises first and second transverse surfaces, an outer wall and an inner wall; during operation, the flange being positioned on the inside of the inner wall of the first pivoting ring and the first transverse surface of said first pivoting ring being pressed against the first transverse face of the first ring.

According to another feature, the first coupling system comprises at least one recessed impression, which is positioned on a first surface from among the first transverse surface of the first pivoting ring and the first transverse face of the first ring, and at least one lug, which is configured to be received in a recessed impression and is positioned on a second surface, different from the first surface, from among the first transverse surface of the first pivoting ring and the first transverse face of the first ring.

According to another feature, the second coupling system comprises at least one recessed impression, which is positioned on a first surface from among the first transverse surface of the flange and the first transverse face of the second ring, and at least one lug, which is configured to be received in a recessed impression and is positioned on a second surface, different from the first surface, from among the first transverse surface of the flange and the first transverse face of the second ring.

According to another feature, the second portion comprises a second pivoting ring connected to the second end of the centering shaft.

According to another feature, the axial tension system comprises a bearing part, which is sheathed around the centering shaft and configured to bear against the second surface of the second part, and a screw configured to be screwed in a tapped hole provided at the first end of the centering shaft and to bear against the bearing part.

Another subject of the invention is a method for mounting a connecting device, characterized in that the mounting method comprises a step of installing the first and second rings, a step of adjusting the angular positioning of the first and second rings, a step of axially tensioning the first and second rings in order to prevent them from rotating, a step of removing the mounting tool, and a step of installing the connecting element.

BRIEF DESCRIPTION OF THE DRAWINGS

Further features and advantages will become apparent from the following description of the invention, which is given solely by way of example, with reference to the appended drawings, in which.

DETAILED DESCRIPTION OF THE PREFERRED EMBODIMENTS

Figure 1:
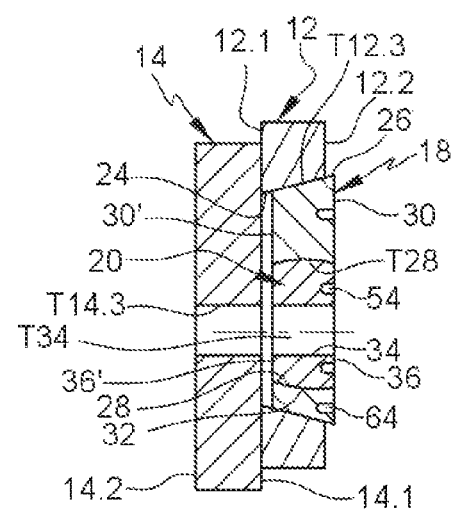
FIG. 1 is a schematic section through an assembly, without a connecting element, illustrating a first embodiment of the invention.

As illustrated in FIGS. 1 to 5, an assembly 10 comprises at least two parts 12, 14 held assembled together by at least one connecting device 16. According to one configuration, the first part 12 has a first surface 12.1 oriented towards the second part 14, a second surface 12.2 opposite the first surface 12.1, and a first through-hole T12.3 which leads into the first and second surfaces 12.1, 12.2. In parallel, the second part 14 has a first surface 14.1 oriented towards the first part 12, a second surface 14.2 opposite the first surface 14.1, and a second through-hole T14.3 which leads into the first and second surfaces 14.1, 14.2.

The connecting device 16 comprises a first off-center ring 18 positioned in the first through-hole T12.3, a second off-center ring 20 positioned in the first ring 18, and a connecting element 22 passing through the second ring 20.

According to one embodiment, the connecting element 22 is a bolt and comprises, for the one part, a screw having an at least partially threaded shaft 22.1 and a head which acts as a first stop 22.2 and, for the other part, a nut which acts as a second stop 22.3 and is configured to be screwed onto the shaft 22.1. Of course, the invention is not limited to this embodiment. Irrespective of the embodiment, the connecting element 22 comprises a shaft 22.1 and first and second stops 22.2, 22.3 integral with the shaft 22.1.

The shaft 22.1 is cylindrical and has an outside diameter D22.1 and an axis A22.1.

For the remainder of the description, a longitudinal direction is a direction parallel to the axis A22.1 of the shaft 22.1. A transverse plane is a plane perpendicular to the axis A22.1 of the shaft 22.1.

According to one configuration, the second through-hole T14.3 is cylindrical and has a very slightly larger diameter than the outside diameter D22.1 of the shaft 22.1. The second stop 22.3 of the connecting element 22 has a larger cross section than that of the second through-hole T14.3 and bears against the second surface 14.2 of the second part 14.

The first through-hole T12.3 has a diameter much larger than the outside diameter D22.1 of the shaft 22.1. The first through-hole T12.3 is delimited by a frustoconical peripheral inner wall 24 having a diameter which decreases towards the second part 14, from the second surface 12.2 to the first surface 12.1.

The first ring 18 comprises a first peripheral outer surface 26 configured to interact with the frustoconical peripheral inner wall 24 of the first through-hole T12.3, a first passage orifice T28 delimited by a first peripheral inner surface 28 configured to interact with the second ring 20, and mutually parallel first and second transverse faces 30, 30'. The first peripheral inner and outer surfaces 28, 26 are not coaxial but off-center. During operation, the second transverse face 30' is oriented towards the second part 14.

According to one configuration, the first peripheral outer surface 26 is frustoconical and has a smaller cross section at the second transverse face 30'. The first peripheral outer surface 26 forms a solid angle substantially equal to that of the peripheral inner wall 24 of the first through-hole T12.3. According to one embodiment, the first peripheral outer surface 26 comprises a larger diameter, in line with the first transverse face 30, which is slightly greater than the largest diameter of the peripheral inner wall 24 of the first through-hole T12.3, in line with the second surface 12.2.

The second ring 20 comprises a second peripheral outer surface 32 configured to interact with the first peripheral inner surface 28 of the first passage orifice T28 of the first ring 18, a second passage orifice T34 which is delimited by a second peripheral inner surface 34 and configured to receive part of the shaft 22.1 of the connecting element 22 during operation, and mutually parallel first and second transverse faces 36, 36'. The second peripheral inner and outer walls 34, 32 are not coaxial but off-center. During operation, the second transverse face 36' is oriented towards the second part 14.

According to one configuration, the second peripheral inner surface 34 is cylindrical and has a diameter substantially equal to the second through-hole T14.3 of the second part 14.

According to one configuration, the first and second rings 18, 20 have substantially the same thickness (distance between the first and second transverse faces 30, 30', 36, 36'). During operation, the first transverse faces 30, 36 of the first and second off-center rings are substantially coplanar. The same applies to the second transverse faces 30', 36'.

Figure 2:
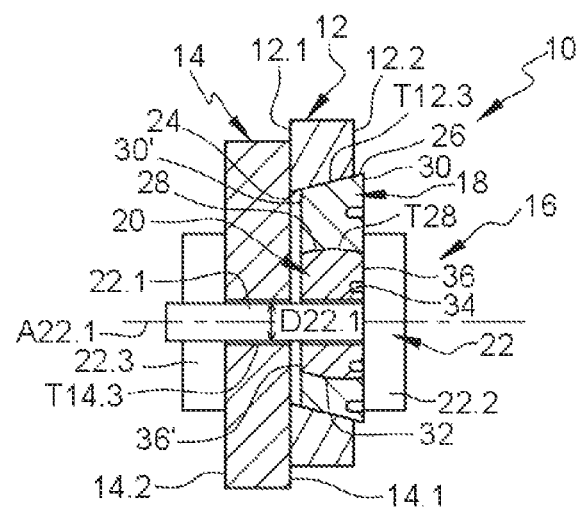
FIG. 2 is a schematic section through the assembly that can be seen in FIG. 1 with a connecting element.

According to a first embodiment that can be seen in FIGS. 1 and 2, the first peripheral inner surface 28 of the first ring 18 and the second peripheral outer surface 32 of the second ring 20 have identical spherical bearing surfaces. Thus, the first and second off-center rings 18, 20 are connected to one another.

Figure 3:
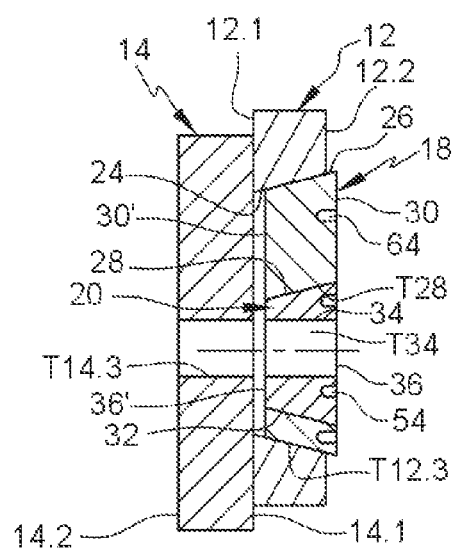
FIG. 3 is a schematic section through an assembly, without a connecting element, illustrating a second embodiment of the invention.
Figure 4:
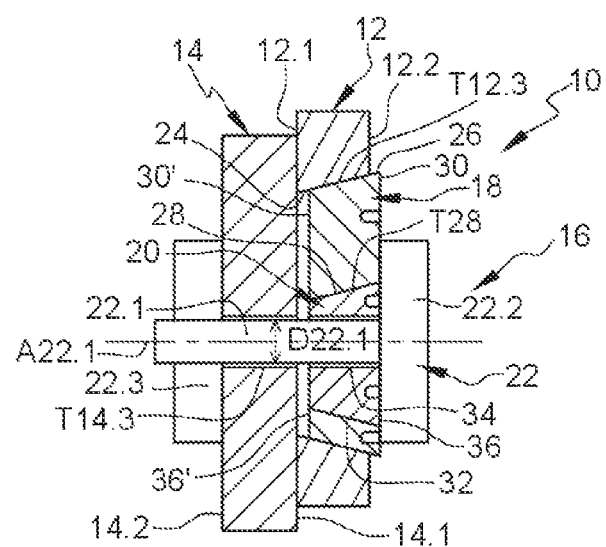
FIG. 4 is a schematic section through the assembly that can be seen in FIG. 3 with a connecting element.

According to a second embodiment that can be seen in FIGS. 3 and 4, the first peripheral inner surface 28 of the first ring 18 and the second peripheral outer surface 32 of the second ring 20 are frustoconical and have substantially the same solid angle.

Irrespective of the embodiment, the first and second rings 18, 20 have shapes exhibiting symmetry of revolution with an axis of revolution parallel to the longitudinal direction in order to enable the first and second rings 18, 20 to pivot in relation to one another. The first peripheral inner surface 28 of the first ring 18 and the second peripheral outer surface 32 of the second ring 20 have substantially identical cross sections at the second transverse faces 30', 36'. For at least one surface from among the first peripheral inner surface 28 and the second peripheral outer surface 32, the cross sections increase between a first cross section and a second cross section that is offset towards the first transverse faces 30, 36 in relation to the first cross section. This configuration makes it possible to prevent the rotation of the second ring 20 in relation to the first ring 18 when an axial force oriented from the first transverse faces 30, 36 to the second transverse faces 30', 36' is applied to the second ring 20.

Providing two off-center rings 18, 20 makes it possible to be able to align the second through-hole T14.3 of the second part 14 with the second passage orifice T34 of the second ring 20 positioned in the first passage orifice T28 of the first ring 18, which is itself positioned in the first through-hole T12.3 of the first part 12. This alignment is possible inasmuch as, in a transverse plane, the second through-hole T14.3 of the second part 14 can be inscribed in the first through-hole T12.3 of the first part 12.

The alignment is obtained by pivoting the first ring 18 in relation to the first part 12 and the first and second rings 18, 20 in relation to one another.

Figure 5:
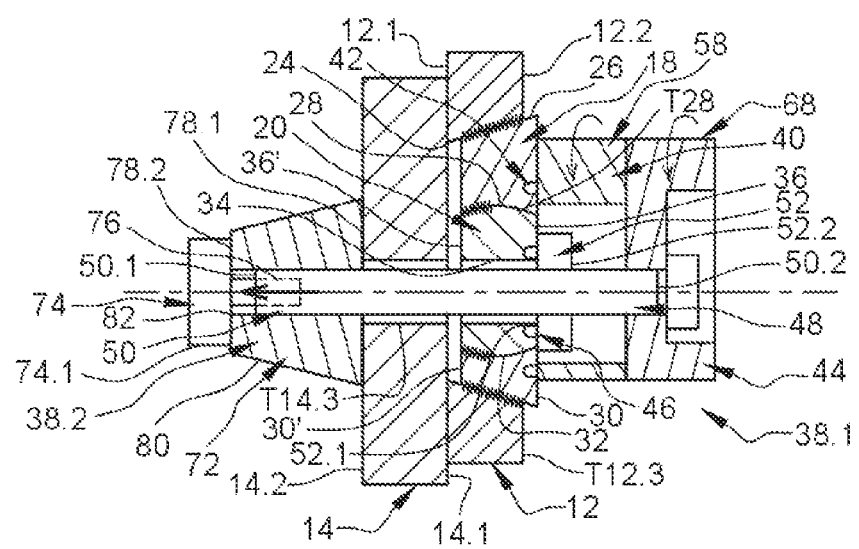
FIG. 5 is a schematic section through an assembly and a mounting tool illustrating one embodiment of the invention.

As illustrated in FIG. 5, a tool for mounting the first and second off-center rings 18, 20 comprises a system 38.1 for adjusting the angular positioning of the first and second rings 18, 20, and a system 38.2 for axially tensioning the first and second rings 18, 20 so as to prevent them from rotating.

According to one embodiment, the angular positioning adjustment system 38.1 comprises a first portion 40 configured to pivot the first ring 18, a first coupling system 42 for temporarily rotationally coupling the first portion 40 and the first ring 18, a second portion 44 configured to pivot the second ring 20, and a second coupling system 46 for temporarily rotationally coupling the second portion 44 and the second ring 20. The first and second portions 40, 44 are independent of one another so as to be able to regulate the angular position of the first and second rings 18, 20 independently of one another.

To facilitate the alignment, the mounting tool 38 comprises a centering system 48 having a centering shaft 50 that has a diameter substantially identical to that of the shaft 22.1 of the connecting element 22.

Figure 6A:
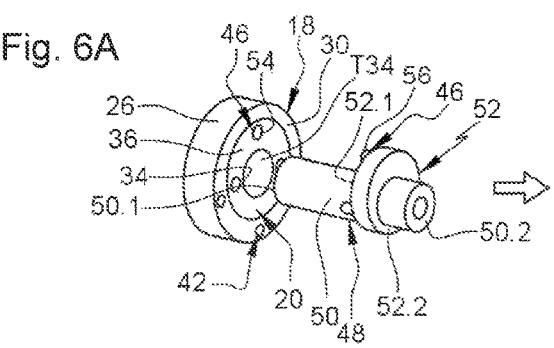
FIGS. 6A-6F are a perspective depiction illustrating the various steps of mounting a portion of the tool that can be seen in FIG. 5, FIGS. 7A-7C are a schematic depiction illustrating a step of installing the off-center rings.

According to an embodiment which can be seen in FIG. 6A, the centering shaft 50 extends between first and second ends 50.1, 50.2. In addition to the centering shaft 50, the centering system 48 comprises a flange 52 which is integral with the centering shaft 50, has a cross section larger than that of the centering shaft 50, and is spaced apart from the first and second ends 50.1, 50.2 of the centering shaft 50.

This flange 52 has a first transverse surface 52.1 oriented towards the first end 50.1 of the centering shaft 50 and a second transverse surface 52.2 oriented towards the second end 50.2 of the centering shaft 50.

Figure 6B:
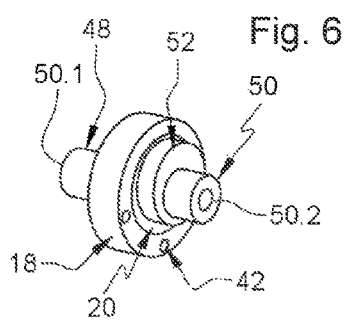

During operation, a portion of the centering shaft 50 is received in the second passage orifice T34 of the second ring 20 and the first transverse surface 52.1 of the flange 52 is pressed against the first transverse face 36 of the second ring 20, as illustrated in FIG. 6B.

According to an embodiment which can be seen in FIG. 6A, the second coupling system 46 comprises at least one recessed impression 54, which is positioned on a first surface from among the first transverse surface 52.1 of the flange 52 and the first transverse face 36 of the second ring 20, and at least one lug 56, which is configured to be received in a recessed impression 54 and is positioned on a second surface, different from the first surface, from among the first transverse surface 52.1 of the flange 52 and the first transverse face 36 of the second ring 20.

According to one configuration, the second coupling system 46 comprises multiple recessed impressions 54 and a lug 56 for each recessed impression 54. According to one arrangement, the recessed impressions 54 are provided on the first transverse face 36 of the second ring 20 and the lugs 56 are positioned on the first transverse surface 52.1 of the flange 52.

Of course, the invention is not restricted to this embodiment for the second coupling system 46.

Figure 6C:
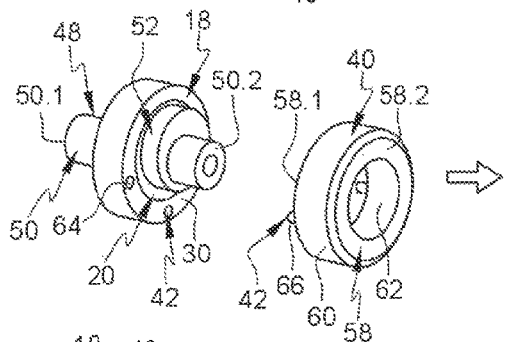
Figure 6D:
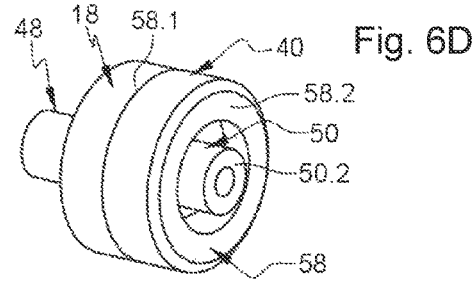

According to an embodiment which can be seen in FIG. 6C, the first portion 40 is in the form of a first pivoting ring 58 which comprises first and second transverse surfaces 58.1, 58.2, an outer wall 60 and a cylindrical inner wall 62. During operation, the flange 52 is positioned on the inside of the inner wall 62 of the first pivoting ring 58 and the first transverse surface 58.1 of said first pivoting ring 58 is pressed against the first transverse face 30 of the first ring 18, as illustrated in FIG. 6D.

According to one embodiment, the first coupling system 42 comprises at least one recessed impression 64, which is positioned on a first surface from among the first transverse surface 58.1 of the first pivoting ring 58 and the first transverse face 30 of the first ring 18, and at least one lug 66, which is configured to be received in a recessed impression 64 and is positioned on a second surface, different from the first surface, from among the first transverse surface 58.1 of the first pivoting ring 58 and the first transverse face 30 of the first ring 18.

According to one configuration, the first coupling system 42 comprises multiple recessed impressions 64 and a lug 66 for each recessed impression 64. According to one arrangement, the recessed impressions 64 are provided on the first transverse face 30 of the first ring 18 and the lugs 66 are positioned on the first transverse surface 58.1 of the first pivoting ring 58, as illustrated in FIG. 6C.

Figure 6E:
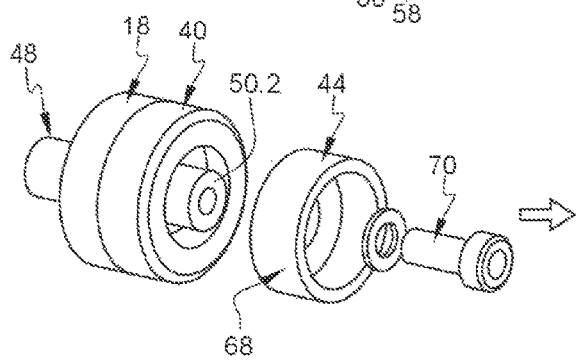
Figure 6F:
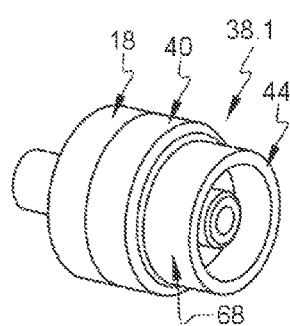

The second portion 44 comprises a second pivoting ring 68 connected to the second end 50.2 of the centering shaft 50 by a fixing element 70, as illustrated in FIGS. 6E and 6F. According to one configuration, the fixing element 70 is a screw which is screwed in a tapped hole provided at the second end 50.2 of the centering shaft 50. The latter is dimensioned such that the second pivoting ring 68 is separated from the second ring 20 by a distance slightly greater than the thickness of the first pivoting ring 58 (the distance between the first and second transverse surfaces 58.1, 58.2).

Of course, the invention is not restricted to these embodiments for the coupling systems 42, 46 and the first and second portions 40, 44. By way of example, the centering system 48 and the second portion 44 could form only one single part.

The axial tension system 38.2 is configured to apply a tensile force to at least the second ring 20 in a direction parallel to the longitudinal direction, going from the first transverse faces 30, 36 towards the second transverse faces 30', 36', in the direction of the second part 14. Owing to the frustoconical or spherical shapes of the first and second rings 18, 20, the rings are thus prevented from rotating.

According to one configuration, the axial tension system 38.2 applies a tensile force only to the second ring 20 which, in turn, applies a tensile force to the first ring 18.

According to an embodiment which can be seen in FIG. 5, the first end 50.1 of the centering shaft 50 protrudes beyond the second surface 14.2 of the second part 14.

The axial tension system 38.2 comprises a bearing part 72, which is sheathed around the centering shaft 50 and configured to bear against the second surface 14.2 of the second part 14, and a screw 74 configured to be screwed in a tapped hole 76 provided at the first end 50.1 of the centering shaft 50 and to bear against the bearing part 72.

According to one embodiment, the bearing part 72 comprises first and second mutually parallel transverse end faces 78.1, 78.2, a frustoconical peripheral lateral face 80 having a larger diameter at the first transverse end face 78.1, and a through-orifice 82 which leads into the first and second transverse end faces 78.1, 78.2 and has an inside diameter substantially equal to or slightly larger than the outside diameter of the centering rod 50.

During operation, the first transverse end face 78.1 is in contact with the second surface 14.2 of the second part 14. In parallel, the screw 74 has a head 74.1 configured to be in contact with the second transverse end face 78.2, as illustrated in FIG. 5. Thus, since its head 74.1 bears against the bearing part 72 in contact with the second part 14, the tightening of the screw 74 causes the centering shaft 50 to pull the first part 12 towards the second part 14. Since the flange 52 of the centering shaft 50 is in contact with the second ring 20, the translational movement of the centering shaft 50 from the first part 12 towards the second part 14 causes the second ring 20 to become immobilized in the first passage orifice T28 of the first ring 18 and the latter to become immobilized in the first through-hole T12.3 of the first part 12.

Of course, the invention is not restricted to this embodiment for the mounting. Thus, at least one of the first and second rings 18, 20 may comprise an axial extension, protruding beyond the first transverse face 30, 36 of said ring 18, 20, that makes it possible to grip said ring so as to pivot it in order to regulate its angular positioning.

Consequently, at a minimum, the mounting tool comprises an axial tension system 38.2 for preventing the rotation of the first and second rings 18, 20. It may comprise at least one system 38.1 for adjusting the angular positioning of at least one of the first and second rings 18, 20.

Figure 7A:
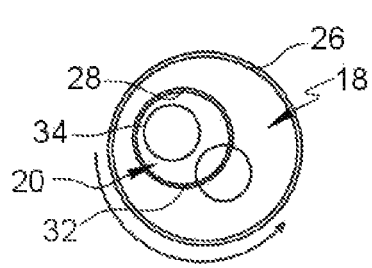
Figure 7B:
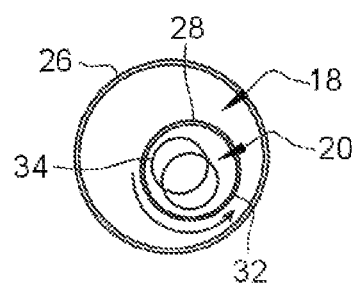
Figure 7C:
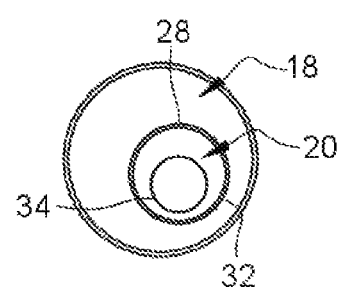
Figure 8:
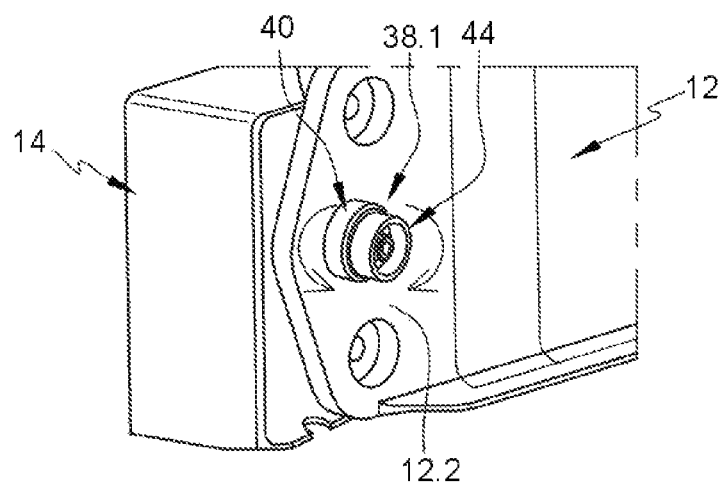
FIG. 8 is a perspective view of an assembly illustrating a step of adjusting the angular positioning of the off-center rings.
Figure 9:
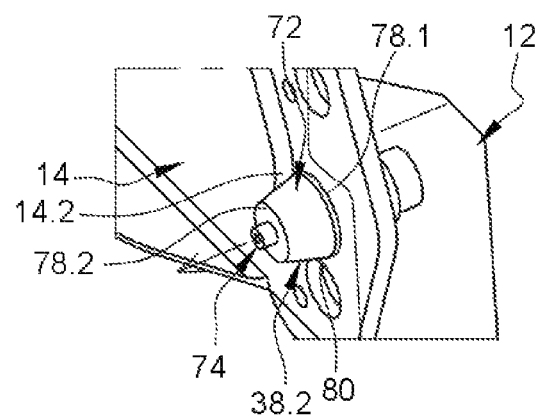
FIG. 9 is a perspective view of the assembly that can be seen in FIG. 8, illustrating a step of axially tensioning the off-center rings.
Figure 10:
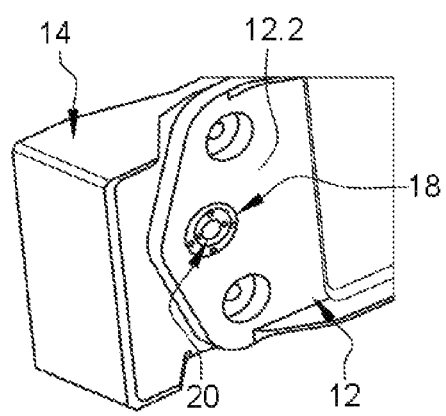
FIG. 10 is a perspective view of the assembly that can be seen in FIG. 9 after the mounting tool has been removed.
Figure 11:
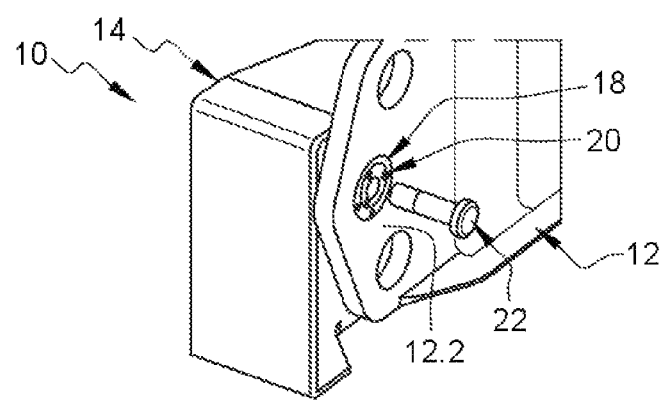
FIG. 11 is a perspective view of the assembly that can be seen in FIG. 10 during a step of installing a connecting element.

As illustrated in FIGS. 7 to 11, the method for mounting the connecting device 16 comprises a step of installing the first and second rings 18, 20, as illustrated in FIGS. 7A-7C, a step of adjusting the angular positioning of the first and second rings 18, 20, as illustrated in FIG. 8, a step of axially tensioning the first and second rings 18, 20, as illustrated in FIG. 9, in order to prevent them from rotating, a step of removing the mounting tool, as illustrated in FIG. 10, and a step of installing the connecting element 22, as illustrated in FIG. 11.

Figure 12:
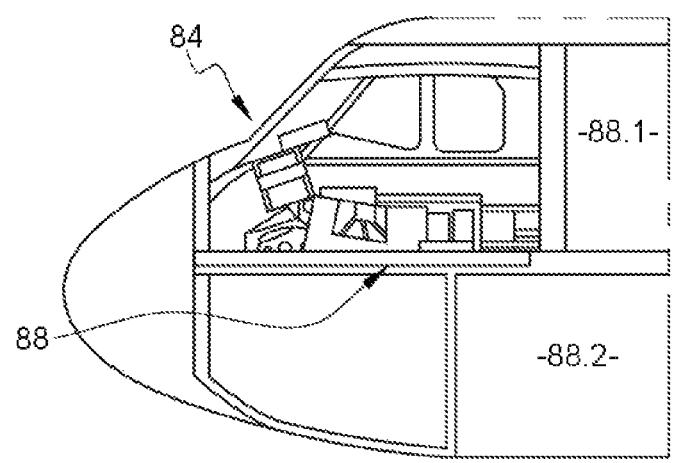
FIG. 12 is a vertical longitudinal section through a front portion of an aircraft, illustrating one embodiment of the invention.
Figure 13:
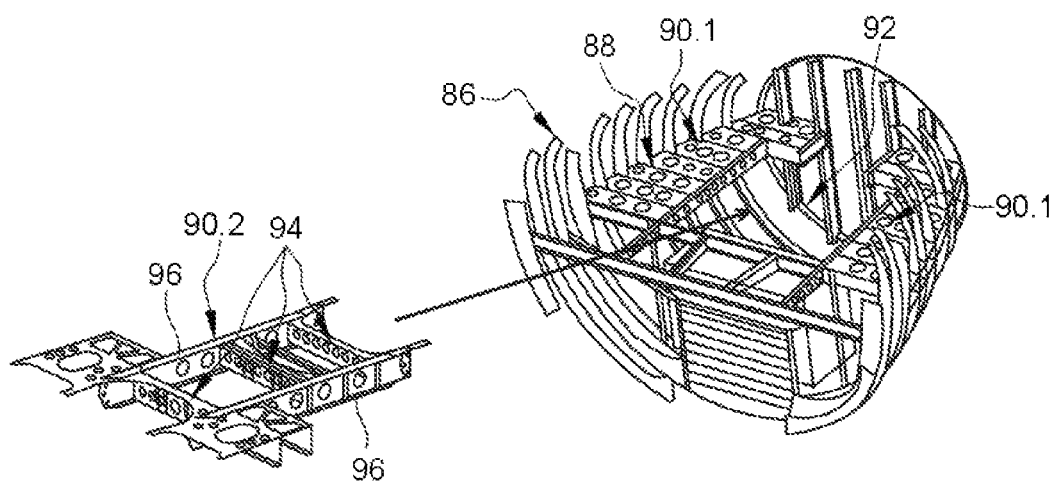
FIG. 13 is a perspective view of a portion of a structure of a nose of an aircraft and of a portion of a floor in the dismounted state, illustrating one embodiment of the invention.
Figure 14:
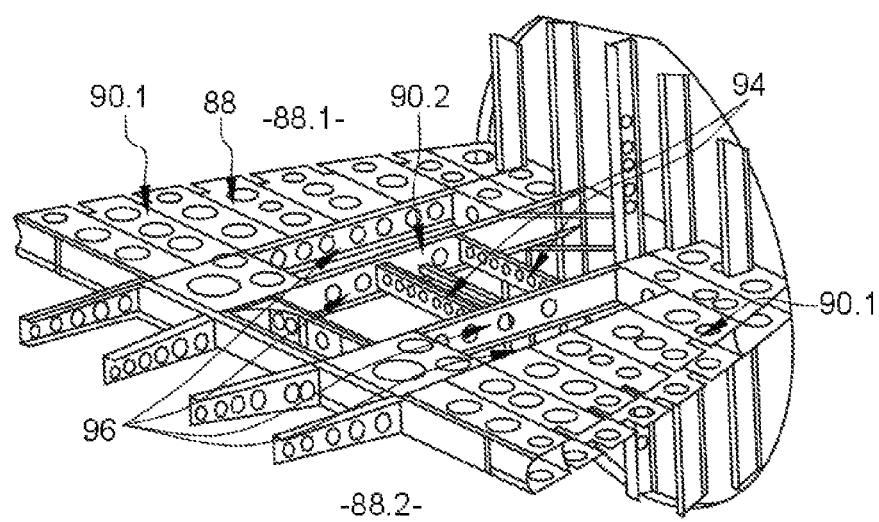
FIG. 14 is a perspective view of the floor that can be seen in FIG. 13 in the mounted state in the nose of the aircraft.

According to an application that can be seen in FIGS. 12 to 14, an aircraft 84 comprises a primary structure 86 forming the fuselage of the aircraft and a floor 88 separating an upper area 88.1, for example a cockpit, from a lower area 88.2, for example a technical bay.

According to a configuration which can be seen in FIG. 13, the floor 88 comprises at least one first portion 90.1, which is fixed and connected to the primary structure 86, and at least one second portion 90.2, which is removable and connected to the first, fixed portion 90.1 by at least one connecting device 16, the first part 12 of an assembly 10 (visible in FIGS. 1 to 5 and 8 to 11) corresponding to the first, fixed portion 90.1 of the floor 88 and the second part 14 of the assembly 10 corresponding to the second portion 90.2 of the floor 88.

Thus, when the second portion 90.2 is in the dismounted state, as illustrated in FIG. 13, the floor 88 comprises a wide opening 92 for introducing bulky objects, such as equipment assembled outside of the aircraft, into the lower area 88.2 located below the floor 88.

According to one embodiment, the floor 88 comprises transverse beams 94 and longitudinal beams 96. At least one transverse or longitudinal beam 94, 96 comprises a first segment secured to the first portion 90.1 of the floor 88, a second segment secured to the second portion 90.2 of the floor 88, and at least one connecting device 16 connecting the first and second segments of the transverse or longitudinal beam 94, 96.

The first and second segments of the first and second portions 90.1, 90.2 of the floor 88 may be pre-drilled. By virtue of its first and second rings 18, 20, the connecting device 16 makes it possible to compensate a possible misalignment of the pre-drilled holes. Thus, it is not necessary to drill holes in the first and second segments of the first and second portions 90.1, 90.2 of the floor 88 while they are being assembled.

Of course, the invention is not limited to this application. Irrespective of the application, the aircraft comprises at least one assembly having at least one connecting device 16.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tool for mounting a connecting device to obtain an assembly comprising at least first and second parts, the connecting device comprising
    a first ring,
    a second ring, and
    a connecting element having a shaft,
        the first ring having a first peripheral outer surface configured to interact with a peripheral inner wall of a first through-hole of the first part of the assembly, a first passage orifice delimited by a first peripheral inner surface configured to interact with the second ring, and first and second transverse faces, the first peripheral inner and outer surfaces being off-center,
        the second ring having a second peripheral outer surface interacting with the first peripheral inner surface of the first ring, a second passage orifice delimited by a second peripheral inner surface and configured to receive a portion of the shaft of the connecting element during operation, and first and second transverse faces, the second peripheral inner and outer walls being off-center,
        the first and second rings having shapes exhibiting symmetry of revolution about an axis of revolution parallel to a longitudinal direction;
        the first peripheral outer surface of the first ring being frustoconical such that a first cross-sectional area of the first ring taken transverse to the longitudinal direction is smaller at the second transverse face of the first ring than a second cross-sectional area of the first ring taken transverse to the longitudinal direction at the first transverse face;
        the first passage orifice has a first cross-sectional area at the first transverse face of the first ring taken transverse to the longitudinal direction that is less than a second cross-sectional area of the first passage orifice taken transverse to the longitudinal direction and parallel to the first cross-sectional area and spaced therefrom;
    wherein the mounting tool comprises an axial tension system configured to apply a tensile force to at least the second ring in a direction parallel to the longitudinal direction, going from the first transverse faces towards the second transverse faces, to prevent a rotation of the first and second rings.

2. The mounting tool according to claim 1, wherein the mounting tool comprises at least one system for adjusting the angular positioning of at least one of the first and second rings.

3. The mounting tool according to claim 2, wherein the angular positioning adjustment system comprises
    a first portion configured to pivot the first ring,
    a first coupling system for temporarily rotationally coupling the first portion and the first ring,
    a second portion configured to pivot the second ring, and
    a second coupling system for temporarily rotationally coupling the second portion and the second ring.

4. The mounting tool according to claim 3, wherein the mounting tool comprises a centering system having a centering shaft which extends between first and second ends and has a diameter identical to that of the shaft of the connecting element, said centering shaft being configured to be received in the second passage orifice of the second ring during operation.

5. The mounting tool according to claim 4, wherein the centering system:
    comprises a flange integral with the centering shaft,
    has a cross section greater than that of the centering shaft,
    is spaced apart from the first and second ends of the centering shaft, and
    has a first transverse surface, which is oriented towards the first end of the centering shaft and is configured to be pressed against the first transverse face of the second ring during operation, and a second transverse surface, which is oriented towards the second end of the centering shaft.

6. The mounting tool according to claim 5, wherein the first portion is formed as a first pivoting ring which comprises first and second transverse surfaces, an outer wall and an inner wall; during operation, the flange being positioned on the inside of the inner wall of the first pivoting ring and the first transverse surface of said first pivoting ring being pressed against the first transverse face of the first ring.

7. The mounting tool according to claim 6, wherein the second portion comprises a second pivoting ring connected to the second end of the centering shaft.

8. The mounting tool according to claim 6, wherein the first coupling system comprises at least one recessed impression, which is positioned on a first surface from among the first transverse surface of the first pivoting ring and the first transverse face of the first ring, and at least one lug, which is configured to be received in a recessed impression and is positioned on a second surface, different from the first surface, from among the first transverse surface of the first pivoting ring and the first transverse face of the first ring.

9. The mounting tool according to claim 5, wherein the second coupling system comprises:
    at least one recessed impression, which is positioned on a first surface from among the first transverse surface of the flange and the first transverse face of the second ring, and at least one lug, which is configured to be received in a recessed impression and is positioned on a second surface, different from the first surface, from among the first transverse surface of the flange and the first transverse face of the second ring.

10. The mounting tool according to claim 9, wherein the axial tension system comprises:
   a bearing part, which is sheathed around the centering shaft and configured to bear against the second surface of the second part, and
   a screw configured to be screwed in a tapped hole provided at the first end of the centering shaft and to bear against the bearing part.

11. A tool for mounting a connecting device to obtain an assembly comprising at least first and second parts, the connecting device comprising
   a first ring,
   a second ring, and
   a connecting element having a shaft,
      the first ring having a first peripheral outer surface configured to interact with a peripheral inner wall of a first through-hole of the first part of the assembly, a first passage orifice delimited by a first peripheral inner surface configured to interact with the second ring, and first and second transverse faces, the first peripheral inner and outer surfaces being off-center,
      the second ring having a second peripheral outer surface interacting with the first peripheral inner surface of the first ring, a second passage orifice delimited by a second peripheral inner surface and configured to receive a portion of the shaft of the connecting element during operation, and first and second transverse faces, the second peripheral inner and outer walls being off-center,
      the first and second rings having shapes exhibiting symmetry of revolution about an axis of revolution parallel to a longitudinal direction;
      the first peripheral outer surface of the first ring being frustoconical and such that a first cross-sectional area of the first ring is smaller at the second transverse face of the first ring than a second cross-sectional area of the first ring at the first transverse face;
      the first passage delimited by the first peripheral inner surface of the first ring has a first cross-sectional area at the first transverse face of the first ring that is greater than a second cross-sectional area of the first passage taken parallel to the first cross-sectional area and spaced therefrom;
   wherein the mounting tool comprises an axial tension system configured to apply a tensile force to at least the second ring in a direction parallel to the longitudinal direction, going from the first transverse faces towards the second transverse faces, to prevent a rotation of the first and second rings
   wherein the mounting tool comprises a centering system having a centering shaft which extends between first and second ends and has a diameter identical to that of the shaft of the connecting element, said centering shaft being configured to be received in the second passage orifice of the second ring during operation,
   wherein the centering system:
      comprises a flange integral with the centering shaft,
      has a cross section greater than that of the centering shaft,
      is spaced apart from the first and second ends of the centering shaft, and
      has a first transverse surface, which is oriented towards the first end of the centering shaft and is configured to be pressed against the first transverse face of the second ring during operation, and a second transverse surface, which is oriented towards the second end of the centering shaft.

* * * * *